United States Patent [19]

Faubl et al.

[11] 3,962,131

[45] June 8, 1976

[54] RHODIUM CONTAINING CATALYST AND USE THEREOF IN PREPARATION OF 6-DEOXY-5-OXYTETRACYCLINE

[75] Inventors: Hermann Faubl, Mystic; Annette M. Belton, Groton, both of Conn.

[73] Assignee: Pfizer Inc., New York, N.Y.

[22] Filed: Jan. 28, 1975

[21] Appl. No.: 544,839

[52] U.S. Cl. ............... 252/429 R; 252/431 C; 252/431 P; 260/559 AT
[51] Int. Cl.² ............ B01J 31/04; B01J 31/24; B01J 31/30
[58] Field of Search ......... 252/429 R, 431 C, 431 P

[56] References Cited
UNITED STATES PATENTS

| | | |
|---|---|---|
| 3,660,493 | 5/1972 | Johnson et al. ............ 252/431 C X |
| 3,748,332 | 7/1973 | Wilkinson ................... 252/431 C X |
| 3,759,838 | 9/1973 | Dewhirst ..................... 252/429 R |
| 3,907,890 | 9/1975 | Scanio ......................... 252/429 R X |

*Primary Examiner*—Patrick P. Garvin
*Attorney, Agent, or Firm*—Connolly and Hutz

[57] ABSTRACT

Catalyst produced by the process of reacting 1 mol of rhodium trichloride and 2 mols of sodium acetate in methanol at a temperature from about 50°C. to the reflux temperature of said reaction mixture, then reacting resulting reaction mixture with 2 mols of triphenylphosphine at a temperature of from about 50°C. to the reflux temperature of said reaction mixture and recovering resulting insoluble material and use thereof in hydrogenating 6-deoxy-6-demethy-6-methylene-5-oxytetracycline to obtain α-6-deoxy-5-oxytetracycline.

3 Claims, No Drawings

RHODIUM CONTAINING CATALYST AND USE THEREOF IN PREPARATION OF 6-DEOXY-5-OXYTETRACYCLINE

BACKGROUND OF THE INVENTION

U.S. Pat. No. 3,200,149 discloses the production of α-6-deoxytetracycline derivatives by a process which involves hydrogenation of certain 6-deoxy-6-demethyl-6-methylenetetracyclines in the presence of a catalytic amount of a noble metal catalyst such as rhodium or palladium. That process coproduces β-6-deoxytetracyclines, as well as α-6-deoxytetracyclines. One of the major objectives of the present invention was to obtain a substitute catalyst which would produce a higher α-isomer to β-isomer ratio.

It has recently been discovered that the diaceto(triphenylphosphine)rhodium(II) complex of the formula

as described by Stephenson et al, J. Chem. Soc. 3632–40 (1965) is stereospecific in the hydrogenation of 6-deoxy-6-demethyl-6-methylene-5-oxytetracycline to the extent that the ratio of α- to β-isomers of 6-deoxy-5-oxytetracycline is greater than 9:1. The catalyst of the present invention which is of unknown structure is stereospecific to about the same extent but is not of the same structure as the aforesaid Stephenson et al catalyst. This can be demonstrated by observing, for example, that whereas the carbon content of the catalyst of the present invention is about 67.77%, the carbon content of Stephenson et al is but 54.6% and by the absence of the $OCOCH_3$ absorption in the NMR and IR spectra.

There are a number of other hydrogenation catalysts known in the prior art which are of the general formula

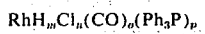

wherein m, n, o and p range from 0 to 3. A variety of such catalysts have been prepared and either on the basis of color, melting point, IR spectrum or carbon and hydrogen and chlorine percentages, it has been found that these are not the catalysts of the instant invention.

SUMMARY OF THE INVENTION

The present invention is based on the discovery the 6-deoxy-6-demethyl-6-methylenetetracycline can be catalytically hydrogenated, in the presence of a specific catalyst, to obtain a stereoselectivity which favors production of the α-isomer over the β-isomer by a factor of at least 9:1. The catalyst of the instant invention is produced by the process of reacting 1 mol of rhodium trichloride and 2 mols of sodium acetate in methanol at a temperature from about 50°C. to the reflux temperature of said reaction mixture, then reacting resulting reaction mixture with 2 mols of triphenylphosphine at a temperature of from about 50°C. to the reflux temperature of said reaction mixture and recovering resulting insoluble material. The presence of methanol in the preparation of the aforesaid catalyst is essential. For example, replacement of methanol by ethanol in the aforesaid procedure fails to produce the desired catalyst.

DETAILED DESCRIPTION OF THE INVENTION

The catalyst of the present invention is produced by reacting 1 mol of rhodium chloride and 2 mols of sodium acetate at a temperature of from about 50°C. to the reflux temperature of the reaction mixture and then reacting resulting reaction mixture with 2 mols of triphenylphosphine at a temperature of from about 50°C. to the reflux temperature of said reaction mixture. Preferably, the rhodium chloride is in the form of the trihydrate of rhodium trichloride. Moreover, the reaction mixture preferably contains from about 1 to about 5% of water based on the weight of methanol.

The catalyst of the present invention can be readily recovered by a variety of means since it precipitates from its reaction mixture. Filtration is as convenient a means as any and may be followed with washing the recovered material with methanol.

Although the structural identity of the catalyst of the instant invention has not been determined because suitable crystal sizes could not be obtained for structural determination by X-ray analysis, there is a wealth of available property information. Said catalyst has a carbon atom content of about 67.77% by weight, a hydrogen content of about 4.89% by weight and a chlorine content of about 4.02% by weight. Additionally, it melts with decomposition at 135°–140°C. It is brownish red in color and soluble in benzene, tetrahydrofuran and chloroform. The infrared spectrum thereof run in a KBr disc at a concentration of 1% by weight exhibits characteristic sharp bands at 2.90, 3.25, 5.05, 6.25, 6.72, 6.94, 7.61, 7.80, 8.45, 8.62, 8.90, 9.15, 9.73, 10.00, 10.85, 11.75, 13.49, 13.85 and 14.80μ. Moreover, it demonstrates no evidence of hydrogen bonded to an $sp^3$ hybridized carbon in an NMR study. It has an envelope of aromatic protons from 6.6–8.0 ppm with prominences at 7.0 and 7.4 ppm being observed in the NMR spectrum when run at 60 Mc. in deuterochloroform as solvent against tetramethylsilane as reference standard. It exhibits a shoulder at 350–375mμ in its UV curve run in methanol as solvent using a 2 cm. cell with absorption maxima occurring at 258, 265, 272 and 360mμ. The $E_{1cm}^{1\%}$ values are 10,354, 1,082.8, 1,040.4 and 20.46, respectively, at a concentration of 0.001%. With thin layer chromatography, it (a) demonstrates a pink spot with $R_f$ 0.4 and a yellow spot with $R_f$ 0.8 when a chloroform solution thereof is subjected to ascending chromatography on a silica gel plate which is developed with ethyl acetate-chloroform in a volume ratio of 1:2 and sprayed with iodoplatinic acid; (b) demonstrates with the system of (a), except for the use of a spray of phenylcarbazide, a trace of a purple spot with $R_f$ 0.2, a white spot with $R_f$ 0.4 and a purple spot with $R_f$ 0.8 and (c) demonstrates with the system of (a), except for the use of benzene as the developing solvent, a brown spot with $R_f$ 0.6.

Suitable starting materials for the hydrogenation process of the present invention include 6-deoxy-6-demethyl-6-methylene-5-oxytetracycline, the acid addition salts thereof and polyvalent metal salt complexes thereof. Preparation of these starting materials is fully disclosed and illustrated in U.S. Pat. No. 3,200,149. In general, the method of preparation involves treatment of an 11a-halo-6,12-hemiketal of oxytetracycline with a strong acid of the dehydrating type such as sulfuric, trifluoroacetic, polyphosphoric, perchloric, hydrogen fluoride and the like. Optimum conditions are readily determined by routine experimentation. Generally, the selected 11a-haloketal is merely added to the selected acid and allowed to react, most appropriately at a temperature within the range of from 0° to 50°C. and for a time of up to several hours. After reaction is complete, the product is recovered in an appropriate manner, e.g., in the case of volatile acids by evaporation of the same to obtain the residual product and, in other cases, by standard procedures such as stirring with a non-solvent, e.g., diethylether, to precipitate an 11a-chloro-6-deoxy-6-demethyl-6-methylene-5oxytetracycline product. Obtaining the corresponding desired 11a-deshalo compound may be accomplished by either chemical or catalytic reduction using procedures well known to those skilled in the art and exemplified in Example IV of U.S. Pat. No. 3,200,149. It will be noted in that example that 11a-fluoro groups are removed by chemical reduction employing zinc dust and a dilute hydrochloric acid, whereas 11a-chloro groups may be removed by either chemical or catalytic reduction. The 6-methylene starting materials of the present invention may be converted to acid addition salts or polyvalent metal salt complexes by standard procedures prior to hydrogenation as taught by U.S. Pat. No. 3,200,149.

The aforesaid 11a-halo-5-oxytetracycline-6,12-hemiketal precursors of the starting materials for the hydrogenation process of the present invention may be prepared in accordance with Examples 1 and 2 of U.S. Pat. No. 3,200,149 examples said examples are incorporated herein by reference.

Appropriate reaction inert solvents for the hydrogenation process of the present invention include those which serve to substantially dissolve the starting materials but which do not adversely interact with either the starting materials or the product. Examples of such solvents include ethers such as diethyl ether, tetrahydrofuran, dioxan, 1,2-dimethoxyethane, lower aliphatic ketones such as acetone and methyl ethyl ketone; low molecular weight esters such as ethyl acetate and butyl acetate; mono- and polyhydric lower alcohols such as methanol, ethanol, isopropanol, ethylene glycol, propylene glycol and diethylene glycol; lower alkoxy substituted alkanols such as 2-methoxyethanol and 2-(2-ethoxyethoxy)ethanol; lower alkanoic acids such as acetic acid and propionic acid; tertiary amides such as N,N-dimethylformamide, N,N-dimethylacetamide and N-methyl-pyrrolidone and mixtures thereof.

Introduction of the hydrogen gas into the reaction inert solvent medium containing the catalyst and starting material is generally accomplished by carrying out the reaction in a sealed vessel under an atmosphere of hydrogen or of hydrogen mixed with an inert diluent such as nitrogen or argon. The pressure inside the reaction vessel may vary from about 1 to about 100 atmospheres gauge. The preferred pressure range, when the atmosphere in the reaction vessel is substantially pure hydrogen, is from about 10 to about 100 psig.

The hydrogenation is generally run at a temperature of from about 20° to about 100°C. and preferably from about 40° to about 70°C. Utilizing the preferred temperature and pressure values, hydrogenation generally takes place in a few hours, e.g., from about 2 hours to about 10 hours.

The expression "catalytic amount" as used herein is well understood by those skilled in the art of known tetracycline hydrogenations. Generally, this amount ranges from about 0.1 to about 100 mol % based on the tetracycline substrate. The preferred amount is from about 1 to about 10 mol %.

The reaction product of the present invention may be isolated from the reaction medium by standard methods. For example, the product can often be induced to precipitate by the addition of a non-solvent such as hexane or water or by the addition of certain agents which form insoluble salts with the product. Alternatively, the crude product can be isolated by evaporation of the solvent or by dilution of the reaction mixture with a large excess of water followed by extraction of the product into a water-immiscible organic solvent and subsequent evaporation of the water-immiscible solvent.

The following examples are for the purpose of illustrating the present invention.

EXAMPLE 1

To a flask equipped with a magnetic stirrer, reflux condenser and nitrogen inlet were sequentially added 1 l. of methanol, 2.75 g (10.4 mmol) rhodium trichloride trihydrate, 30 ml of water and 1.715 g (20.8 mmol) sodium acetate. The mixture was then refluxed for 1 hour. Based on separate thin layer chromatography and IR studies, it was determined that at best only traces of rhodium acetate were present. Following the aforesaid refluxing for 1 hour, 5.475 g (20.8 mmols) of triphenylphosphine were added to the reaction. Immediate precipitation was observed but reflux was continued for 3 hours more. Following reflux, the reaction mixture was cooled and the insoluble material was filtered off, washed with methanol and dried to afford 4.43 g of brownish-red colored crystals having a melting point of 183°C. with decomposition starting at approximately 148°C. One gram of the aforesaid product was repulped for 5 minutes in refluxing methanol and 910 mg were recovered by filtration. Thin layer chromatography and IR were the same as those for the originally recovered materials. The melting point of the repulped material was 135°–140°C. with decomposition. The infrared spectrum of this product has no absorption corresponding to $OCOCH_3$. It seems to be unaffected by exposure to air but chloroform solutions thereof are not stable. It may be routinely stored under nitrogen.

EXAMPLE 2

A Parr bottle was charged with 25 mg of catalyst prepared in accordance with Example 1, 2 g of 6-demethyl-6-deoxy-6-methylene-5-oxytetracycline hydrochloride and 30 ml of deaerated methanol. The bottle was flushed with nitrogen and then with hydrogen. It was then charged with hydrogen to a pressure of 45 psig and the reaction mixture was heated to 70°C. for approximately 3.5 hours. The reaction mixture was cooled, removed from the bottle and diluted with 100 ml of methanol. Thirty ml of a 10% aqueous solution of sulfosalicylic acid and 20 ml of water were added to the diluted reaction mixture with stirring. A precipitate formed immediately and stirring was continued for 1 hour. The mixture was refrigerated and then filtered. The filter cake was washed with warm methanol and then dried to obtain 2.73 g, yield of 98.8%. Ultraviolet assay showed that the product was 99.7% pure α-6-deoxy-5-oxytetracycline.

When using the intermediate reaction product of Example 1 above (obtained by reacting rhodium trichloride trihydrate and sodium acetate) in the hydrogenation procedure of this example, the product obtained contains about equal amounts of α- and β-6-deoxy-5-oxytetracycline.

On substituting rhodium acetate, $Rh_2(OCOCH_3)_4$, in the above-described hydrogenation procedure while using 46 mg thereof (0.2089 mmols), assay of the reaction mixture shows a yield of the $\beta$-epimer which is greater than that of the $\alpha$-epimer which, in turn, was greater than the amount of unreacted 6-deoxy-6-demethyl-6-methylene-5-oxytetracycline hydrochloride starting material.

What is claimed is:

1. A catalyst produced by the process of reacting 1 mol of rhodium trichloride and 2 mols of sodium acetate in methanol at a temperature from about 50°C. to the reflux temperature of said reaction mixture, then reacting resulting reaction mixture with 2 mols of triphenylphosphine at a temperature of from about 50°C. to the reflux temperature of said reaction mixture and recovering resulting insoluble material.

2. The catalyst of claim 1 wherein said reaction mixture contains from about 1 to about 5% of water based on the weight of methanol.

3. The catalyst of claim 1 wherein said rhodium trichloride is the trihydrate of rhodium trichloride.

* * * * *